US012655884B2

(12) United States Patent
Hurd et al.

(10) Patent No.: US 12,655,884 B2
(45) Date of Patent: Jun. 16, 2026

(54) DAMPER LIMITING SYSTEM

(71) Applicants: ThyssenKrupp Bilstein of America Inc., Hamilton, OH (US); thyssenkrupp AG, Essen (DE)

(72) Inventors: Joseph Hurd, Liberty Township, OH (US); Austin Vibbard, Hamilton, OH (US); Jayson Moore, Cinncinnati, OH (US); Bill Bryant, West Chester, OH (US)

(73) Assignees: ThyssenKrupp Bilstein of America Inc., Hamilton, OH (US); thyssenkrupp AG, Essen (DE)

( * ) Notice: Subject to any disclaimer, the term of this patent is extended or adjusted under 35 U.S.C. 154(b) by 314 days.

(21) Appl. No.: 18/640,203

(22) Filed: Apr. 19, 2024

(65) Prior Publication Data

US 2025/0327503 A1 Oct. 23, 2025

(51) Int. Cl.
F16F 9/58 (2006.01)
F16F 9/18 (2006.01)
F16F 9/36 (2006.01)

(52) U.S. Cl.
CPC .............. F16F 9/585 (2013.01); F16F 9/182 (2013.01); F16F 9/362 (2013.01); *F16F 2222/12* (2013.01); *F16F 2230/007* (2013.01); *F16F 2230/30* (2013.01)

(58) Field of Classification Search
CPC ........... F16F 9/585; F16F 9/182; F16F 9/362; F16F 2222/12; F16F 2230/007; F16F 2230/30
USPC ..... 188/315, 322.15, 322.16–322.18, 322.22
See application file for complete search history.

(56) References Cited

U.S. PATENT DOCUMENTS

| | | | |
|---|---|---|---|
| 3,007,550 A | 11/1961 | Long, Jr. | |
| 5,720,473 A * | 2/1998 | Thomas .................... | F16F 9/06 |
| | | | 267/221 |
| 10,030,737 B2 | 7/2018 | Dillman et al. | |
| 10,619,696 B2 | 4/2020 | Dillman et al. | |
| 11,135,890 B2 | 10/2021 | Ellifson et al. | |
| 11,668,367 B2 * | 6/2023 | Kasprzyk ................ | F16F 9/185 |
| | | | 188/284 |
| 11,919,349 B2 * | 3/2024 | Lun ........................... | F16F 9/49 |
| 12,110,945 B2 * | 10/2024 | Sankaran ................. | B60G 7/04 |
| 12,416,344 B2 * | 9/2025 | Sarapata ................. | F16F 9/49 |
| 12,422,017 B2 * | 9/2025 | Kasprzyk ................ | F16F 9/486 |

(Continued)

FOREIGN PATENT DOCUMENTS

| | | |
|---|---|---|
| CN | 116 608 235 A | 8/2023 |
| DE | 24 45 240 A1 | 4/1976 |

(Continued)

*Primary Examiner* — Christopher P Schwartz
(74) *Attorney, Agent, or Firm* — thyssenkrupp North America, LLC

(57) ABSTRACT

A hydraulic vibration damper includes a housing assembly and a rod assembly. The housing assembly includes a main housing, an end cap and a rebound cut off (RCO) assembly. The rod assembly includes a hollow piston rod coupled to a main piston assembly. The main piston assembly includes a main piston that is displaced along the main housing between extension and compression directions. The RCO assembly is disposed between the main housing and the hollow piston rod and includes an RCO piston and an RCO flask. The RCO flask has a flask body including at least one flask passage defined therein that communicates hydraulic fluid along the flask body.

20 Claims, 9 Drawing Sheets

(56)                    References Cited

U.S. PATENT DOCUMENTS

2025/0172189  A1*    5/2025   Schwedler ............. F16F 9/368
2026/0077628  A1*    3/2026   Schwedler ............ B60G 13/08

FOREIGN PATENT DOCUMENTS

EP         2 956 687  B1     4/2017
GB         2 158 181  A     11/1985

* cited by examiner

DAMPER LIMITING SYSTEM

FIELD

The present application generally relates to hydraulic vibration dampers and more particularly to a hydraulic vibration damper that incorporates a rebound cut off assembly that provides end stop control.

BACKGROUND

Hydraulic vibration dampers are used in vehicles to dissipate vibration energy caused from the vehicle travelling over uneven road surfaces. Generally, vibration dampers can include a damper tube and a working piston guided in the damper tube along a longitudinal axis. A piston rod leading out of the damper tube can be arranged on the working piston and, by way of the piston rod, the working piston can be displaced in the damper tube. The piston rod is caused to traverse within the damper tube in an extension direction and a compression or retraction direction during a damping event. In general, the piston rod can be limited in the extension direction at a fully extended position and in the compression or retraction direction at a fully retracted position. In examples, it can be desirable to mitigate the forces seen on the vibration damper before reaching the fully extended position. For example, at full extension, undesirable noise, vibration and harshness (NVH) characteristics can result due to any abrupt contact of features within the vibration damper at, or near, full extension. Accordingly, while such conventional hydraulic vibration dampers work well for their intended purpose, there exists an opportunity for improvement in the relevant art.

SUMMARY

According to one example aspect of the present disclosure, a hydraulic vibration damper includes a housing assembly and a rod assembly. The housing assembly includes a main housing, an end cap and a rebound cut off (RCO assembly). The rod assembly includes a hollow piston rod coupled to a main piston assembly, the main piston assembly has a main piston that is displaced along the main housing between extension and compression directions. The RCO assembly is disposed between the main housing and the hollow piston rod. The RCO assembly includes an RCO piston and an RCO flask. The RCO piston has a piston body including a first engaging surface, a second engaging surface and an outer annular sliding surface. The RCO flask has a flask body including an inner diameter surface and an outer diameter surface. The RCO flask body defines at least one flask passage defined therein that communicates hydraulic fluid along the flask body. The RCO piston is configured to translate relative to the RCO flask during a rebound event due to urging of the main piston, wherein during the translation, the hydraulic fluid is caused to flow (i) from a high pressure zone between the hollow piston rod and the RCO flask; (ii) along the at least one passage; and (iii) into a low pressure zone between the RCO flask and the main housing.

In addition to the foregoing, the RCO flask body extends between a first axial end and a second axial end, the RCO flask body defines a flask shoulder at the first axial end. The flask shoulder engages the RCO piston and therefore limits movement of the RCO piston at a home position prior to and subsequent to the rebound event.

In addition to the foregoing, the RCO assembly further comprises a biasing member disposed between the end cap and the RCO piston, the biasing member biasing the RCO piston toward the home position.

In addition to the foregoing, the main piston includes an annular wall having an end working surface, wherein the first engaging surface of the RCO piston engages the end working surface during the rebound event.

In addition to the foregoing, in one example, the at least one passage can further comprise first passages having first diameters and second passages having second diameters, wherein the first and second diameters are distinct corresponding to supporting distinct flow rates therethrough.

In other features, the flask body defines at least one channel formed on the outer diameter surface, wherein the at least one passage is defined at the at least one channel.

In additional features, the at least one channel defines a relief notch, wherein hydraulic fluid flows from the low pressure zone, through the relief notch, past the main piston and to a compression side of the main piston during the rebound event.

In other examples, during the rebound event a first pressure is defined at a first zone bypass area, a second pressure is defined at a second zone bypass area, and a third pressure is defined at a third zone bypass area, the first zone bypass area defined with all passages of the first and second passages, the second zone bypass area defined with only the second passages of the first and second passages, and the third zone bypass area defined at the relief notch.

In other examples, the hydraulic vibration damper can additionally include a locking ring fixed to an inner surface of the main housing, the locking ring constraining the end cap relative to the main housing.

In additional features, the second engaging surface of the RCO piston engages the impact surface of the end cap at an end of the rebound event.

According to another example aspect of the invention, a hydraulic vibration damper includes a housing assembly and a rod assembly. The housing assembly includes a main housing, an end cap and a rebound cut off (RCO assembly). The rod assembly includes a hollow piston rod coupled to a main piston, the main piston having a main body that includes an annular wall having an end working surface thereon. The main piston is displaced along the main housing between extension and compression directions. The RCO assembly is disposed between the main housing and the hollow piston rod and includes an RCO piston and an RCO flask. The RCO piston includes a piston body including a first engaging surface, a second engaging surface and an outer annular sliding surface. The RCO flask includes a flask body having an inner diameter surface and an outer diameter surface. The RCO flask body defines at least one flask passage defined from the inner diameter surface to the outer diameter surface. The first engaging surface of the RCO piston is engaged by the end working surface of the main piston causing the RCO piston to translate relative to the RCO flask during a rebound event, wherein during the translation, hydraulic fluid is caused to flow through the passages and past the main piston to a compression side of the main piston thereby mitigating end-of-stroke NVH.

In other features, the RCO flask body extends between a first axial end and a second axial end, the RCO flask body defining a flask shoulder at the first axial end, wherein the flask shoulder engages the RCO piston and therefore limits movement of the RCO piston at a home position prior to and subsequent to the rebound event.

the RCO assembly further comprises a biasing member disposed between the end cap and the RCO piston, the biasing member biasing the RCO piston toward the home position.

In addition to the foregoing, the at least one passage further comprises first passages having first diameters and second passages having second diameters, wherein the first and second diameters are distinct corresponding to supporting distinct flow rates therethrough.

In other features, the flask body at least one channel formed on the outer diameter surface, wherein the first and second passages are defined at the at least one channel.

In additional features, the at least one channel defines a relief notch, wherein hydraulic fluid flows from the low pressure zone, through the relief notch, past the main piston and to a compression side of the main piston during the rebound event.

In other examples, during the rebound event a first pressure is defined at a first zone bypass area, a second pressure is defined at a second zone bypass area, and a third pressure is defined at a third zone bypass area, the first zone bypass area defined with all passages of the first and second passages, the second zone bypass area defined with only the second passages of the first and second passages, and the third zone bypass area defined at the relief notch.

In other examples, the hydraulic vibration damper can additionally include a locking ring fixed to an inner surface of the main housing, the locking ring constraining the end cap relative to the main housing.

In further features, the second engaging surface of the RCO piston engages the impact surface of the end cap at an end of the rebound event.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As identified above, in hydraulic vibration dampers, the piston rod can be limited in the extension direction at a fully extended position and in the compression or retraction direction at a fully retracted position. In examples, it can be desirable to increase the forces seen on the vibration damper before reaching the fully extended position to reduce how much energy goes into a hard stop impact and thereby avoid any harsh impacts experienced within the vibration damper at, or near, full extension. As explained in greater detail herein, the present disclosure provides a hydraulic vibration damper having hydraulic rebound end stop control to improve comfort and control of a vehicle when the vehicle wheels travel to full extension. The hydraulic rebound end stop control is provided by a rebound cut off (RCO) assembly including an RCO piston, an RCO flask and a biasing member or return spring.

The RCO piston is housed for slidable movement relative to the RCO flask. The RCO flask contains passages or orifices that allow hydraulic fluid to be displaced through the RCO flask and back into the main working chamber while the RCO piston is translating through a rebound stroke. The translation of the RCO piston within the RCO flask is referred to herein as a rebound stroke. The RCO assembly mitigates NVH of the damper assembly near full extension through the rebound stroke.

Figure 1:
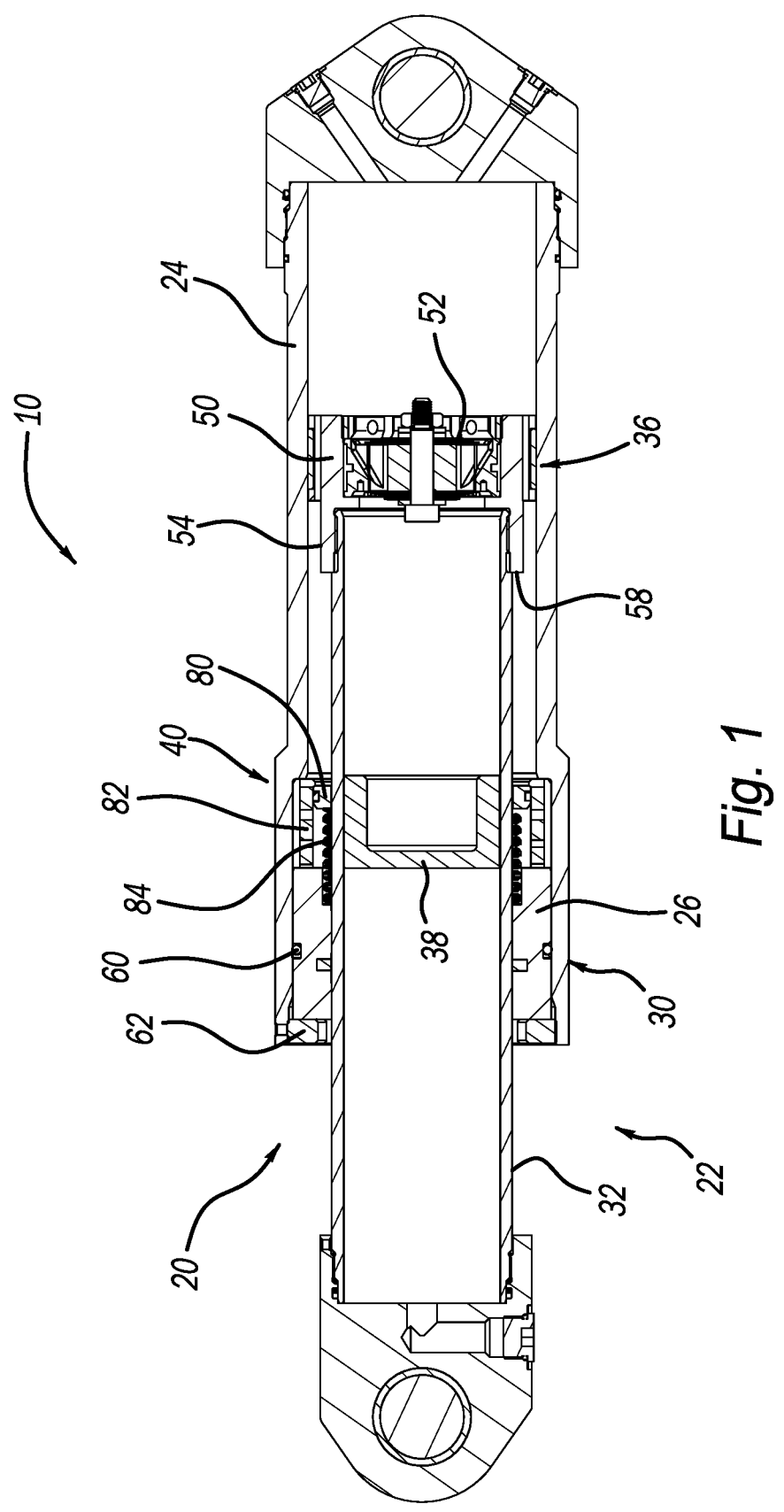
FIG. 1 is a sectional view of a hydraulic vibration damper having a rebound cut off (RCO) assembly constructed in accordance with the principles of the present application, the RCO assembly including an RCO piston and an RCO flask, the RCO piston shown in a home position.
Figure 2:
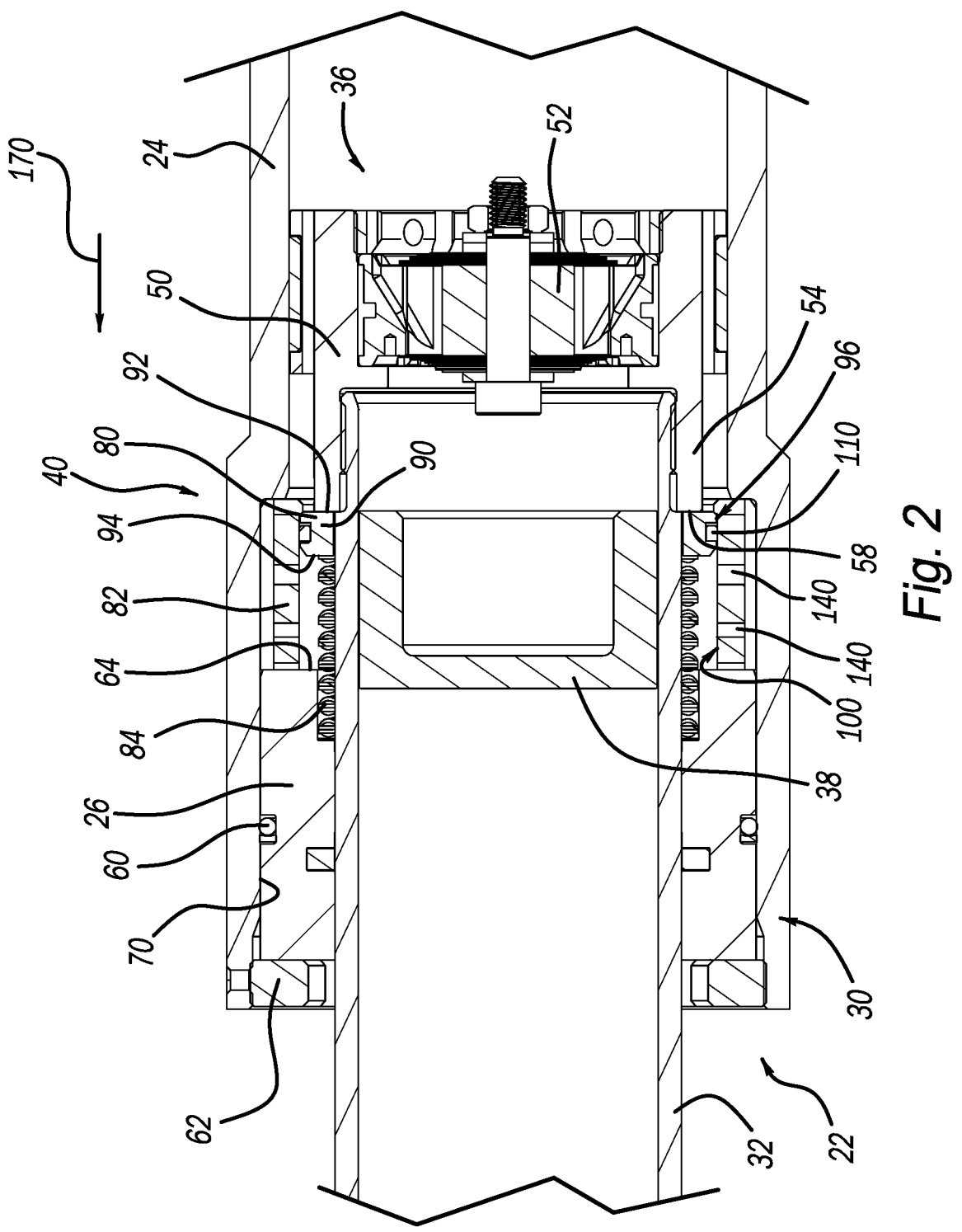
FIG. 2 is a detail sectional view of the hydraulic vibration damper of FIG. 1 and shown during an initial contact of the RCO piston during a rebound event according to principles of the present application.

With initial reference to FIGS. 1 and 2, a hydraulic vibration damper constructed in accordance to examples of the present disclosure is shown and generally identified at reference numeral 10. The hydraulic vibration damper 10 generally includes a housing assembly 20 and a rod assembly 22. The housing assembly 20 includes a main housing 24, an end cap 26 and a rebound cut off (RCO) assembly 40. The rod assembly 22 includes a hollow piston rod 32 and a main piston assembly 36. A dividing piston 38 is generally disposed within the hollow piston rid 32. The housing assembly 20 generally includes a main housing 24 and a hollow piston rod 32. The main piston assembly 36 generally includes a main piston 50 having a main body 52 and an annular wall 54. The annular wall 54 includes an end working surface 58. A seal pack assembly 30 generally includes the end cap 26, a sealing member such as an O-ring 60 and a locking ring 62. The end cap 26 includes an impact surface 64 (FIG. 2). The locking ring 62 can be fixed to an inner surface 70 of the main housing 24. In examples, the locking ring 62 can be threaded on its outer diameter and fixed to the inner surface 70 of the main housing 24. Other arrangements are contemplated. For example, the end cap 26 can be directly threaded to the main housing 24.

The RCO assembly 40 generally includes an RCO piston 80, an RCO flask 82 and a biasing member or spring 84. The RCO piston 80 includes a piston body 90 having a first engaging surface 92, a second engaging surface 94 and an outer annular sliding surface 96. The RCO piston 80 is generally solid with no bypass orifices. The first engaging surface 92 is configured to be engaged by the end working surface 58 of the main piston 50 during the rebound stroke. The second engaging surface 94 is configured to be engaged by the biasing member 84. The outer annular sliding surface 96 is configured to slidably translate along an inner diameter surface 100 of the RCO flask 82. In examples, a seal member such as an O-ring 110 is disposed around the RCO piston 80 at the outer annular sliding surface 96. The biasing member 84 can be configured as a wave spring. Other configurations are contemplated.

Figure 4A:
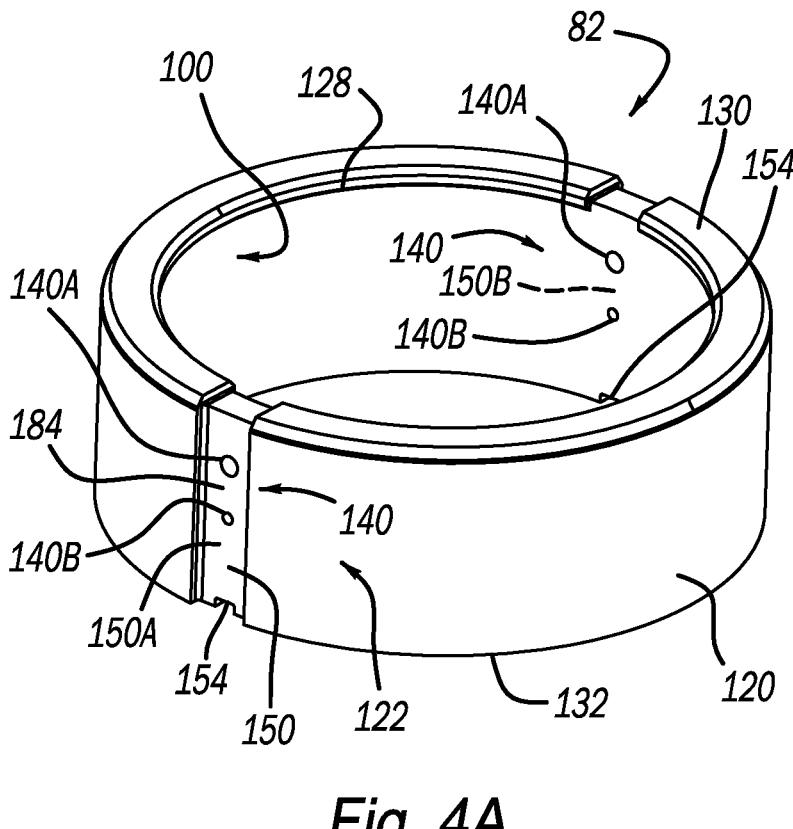
FIG. 4A is a perspective view of the RCO flask of the RCO assembly.

With continued reference to FIGS. 1 and 2 and additional reference now to FIG. 4A, the RCO flask 82 will be further described. The RCO flask 82 generally includes a flask body 120 having the inner diameter surface 100 and an outer diameter surface 122. The flask body 120 generally extends between a first axial end 130 and a second axial end 132. A flask shoulder 128 is arranged at the first axial end 130 of the flask body 120. The flask shoulder 128 is configured to limit travel of the RCO piston 80 (against the bias of the biasing member 84) when the main piston 50 is not engaged to and displacing the RCO piston 80 (e.g., when the RCO piston 80 is at the home position, FIG. 2).

Flask passages, collectively identified at 140 and individually identified at 140A and 140B are defined through the flask body 120 from the inner diameter surface 100 to the outer diameter surface 122. In examples, two sets of flask passages 140 are defined at diametrically opposed locations on the flask body 120. Channels, collectively defined at 150 and individually defined at 150A and 150B are defined on the outer diameter surface 122. Relief notches 154A and 154B are defined in the flask body 120 at the respective channels 150A and 150B at the second end 132 of the flask body 120. While two channels 150 are shown, it is contemplated that only one channel or more than two channels may be provided. Moreover, some or all of the channels may be configured with similar passages 140 defined through the flask body 120.

In examples, the passages 140A can have first diameters while the passages 140B can have second diameters. The first and second diameters can be distinct for allowing different flow rates therethrough. In the examples shown, the passages 140A can be greater than the passages 140B.

With particular reference now to FIG. 2, initial contact of the RCO assembly 40 during a rebound event according to principles of the present application will be described. During a rebound event, the main piston 50 travels along the main housing 24 in an extension direction 170. Sufficient travel in the extension direction 170 causes the main piston 50 to engage the RCO piston 80. In particular, the end working surface 58 on the annular wall 54 engages the first engaging surface 92 of the RCO piston 80. The main piston 50 and the RCO piston 80 are now coupled together creating a metal-to-metal seal between the end working surface 158 and the first engaging surface 92. The RCO piston 80 is now ready to be urged toward the end cap 26 by the main piston 50 against the bias of the biasing member 84.

Figure 3:
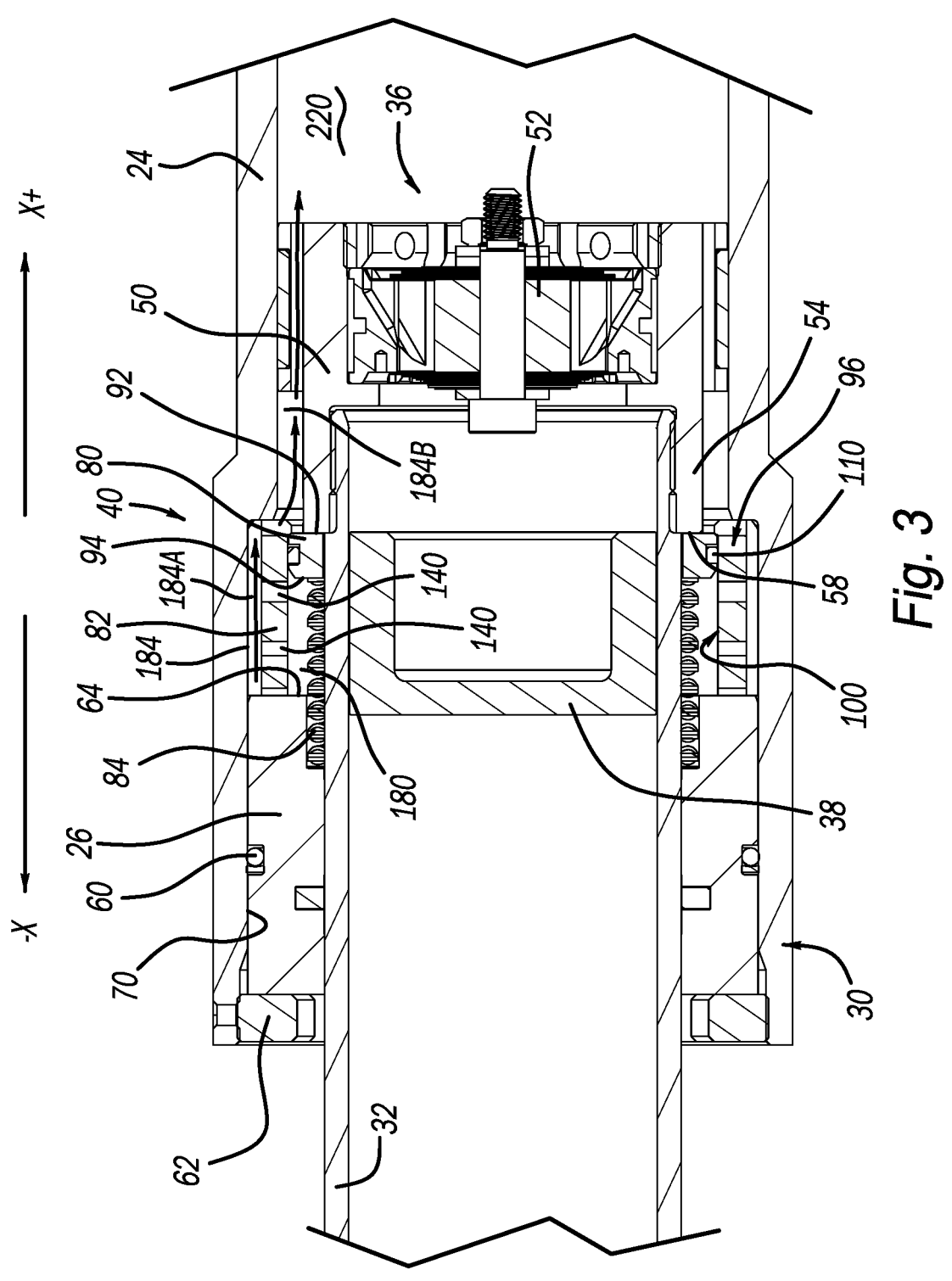
FIG. 3 is a detail sectional view of the hydraulic vibration damper of FIG. 2 and shown during initial movement of the RCO piston in a working direction due to urging of the main piston causing a high pressure zone to be created inside the RCO flask and a low pressure zone to be created outside the RCO flask.

Turning now to FIG. 3, a rebound event will be further described. An RCO damping zone is created due to movement of the RCO piston 80 along the inner diameter surface 100 of the RCO flask 82. In particular, initial movement of the RCO piston 80 causes a high-pressure zone 180 to be created inside the RCO flask 82 and a low-pressure zone 184 to be created outside the RCO flask 82. Explained further, the high-pressure zone 180 created inside the RCO flask 82 is due to a large volume of hydraulic fluid disposed between the hollow piston rod 32 and the inner diameter surface 100 of the RCO flask 82 being forced out of the passages 140 (from the inner diameter surface 100 to the outer diameter surface 122). Once the high-pressure hydraulic fluid exits the passages 140, the exiting cross-sectional area is increased again causing the low-pressure zone 184 to be created. The RCO piston 80 generates a force in the X+ direction from the differential pressure multiplied by the projected area of the RCO piston 80 represented by the following equation:

$$\text{Force}_{x+} = \pi\left(r_{od}^2 - r_{id}^2\right) * \left(P_H - P_L\right)$$

Figure 4B:
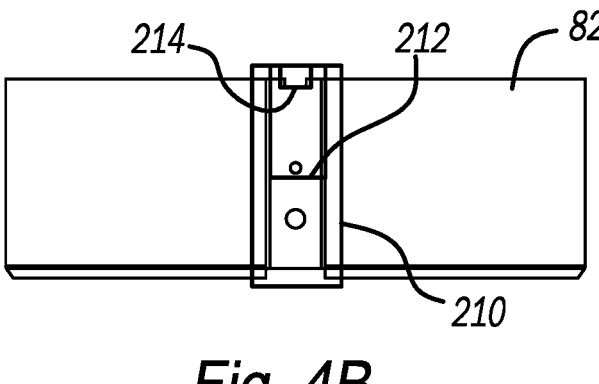
FIG. 4B is a side view of the RCO flask of FIG. 4A shown with various pressure areas identified.
Figure 5:
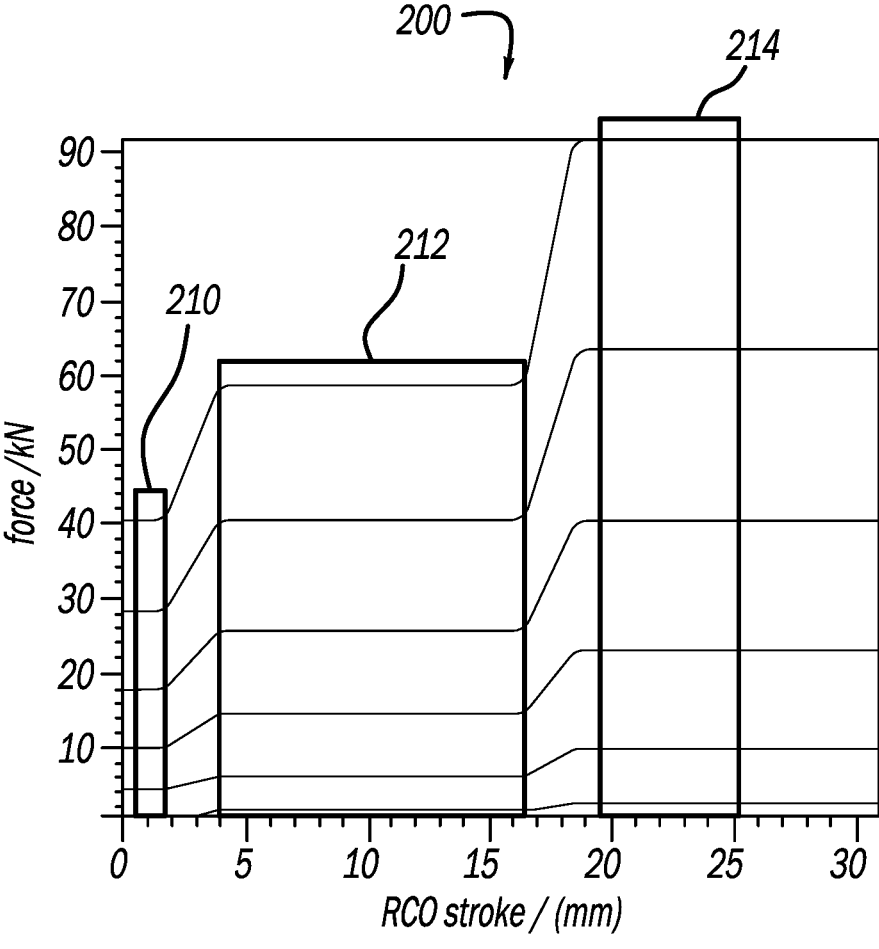
FIG. 5 is plot illustrating respective pressures experienced at a first, second and third zone bypass area, the pressures being created due to high-pressure hydraulic fluid being pushed out through passages in the RCO flask creating a low-pressure zone inside a channel defined on the outer diameter of the flask.

With continued reference to FIG. 3 and additional reference to FIGS. 4A, 4B and 5, additional description of the rebound event will be described. FIG. 5 is plot 200 illustrating respective pressures experienced at a first, second and third zone bypass area 210, 212 and 214, respectively. The pressures are created due to high-pressure hydraulic fluid being pushed out through the passages 140 in the RCO flask 82 creating the low-pressure zone 184A inside the channel 150 defined on the outer diameter surface 122 of the flask 82. Low pressure hydraulic fluid flows from the first low-pressure zone 184A, down the channel 150 out through the relief notch 154 to a second low pressure zone 184B and finally past the main piston 50 to the compression side 220 of the main piston 50.

As illustrated at FIG. 5, as the RCO piston 80 travels through the RCO flask 82, the cross sectional area of the passages 140 decreases which creates steps of higher internal pressure which is dependent on velocity of the RCO piston 80. Explained further, in examples, during initial travel of the RCO piston 80, all passages 140A, 140B are open and available to transfer hydraulic fluid from the high pressure zone 180 to the low pressure zone 184. As the RCO piston 80 travels further, some of the passages (e.g., one of 140A or 140B) are not available to transfer hydraulic fluid as the RCO piston 80 has passed them (e.g., such as at the position shown in FIG. 7) leaving only some of the passages (e.g., remaining passages 140A or 140B of the passages 140).

Turning now to FIGS. 4C-4F, RCO flasks constructed in accordance to additional examples will be described. Unless otherwise described herein, the RCO flasks FIGS. 4C-4F have characteristics consistent with the RCO flask 82 described above. As will become appreciated, the RCO flask can be designed with alternate passages for regulating flow of hydraulic fluid. As used herein the term "passages" is used to denote any of the passages 140 in RCO flask 82 or passages 140C-140L described below in the RCO flasks 82A-82D. The quantity and speed of the hydraulic flow is dependent upon the shape, size and quantity of the passages. In this way, the RCO flask can be designed to fit a specific application that may require different characteristics (e.g., damping rates etc. during a rebound event).

Figures 4C, 4D, 4E, 4F:
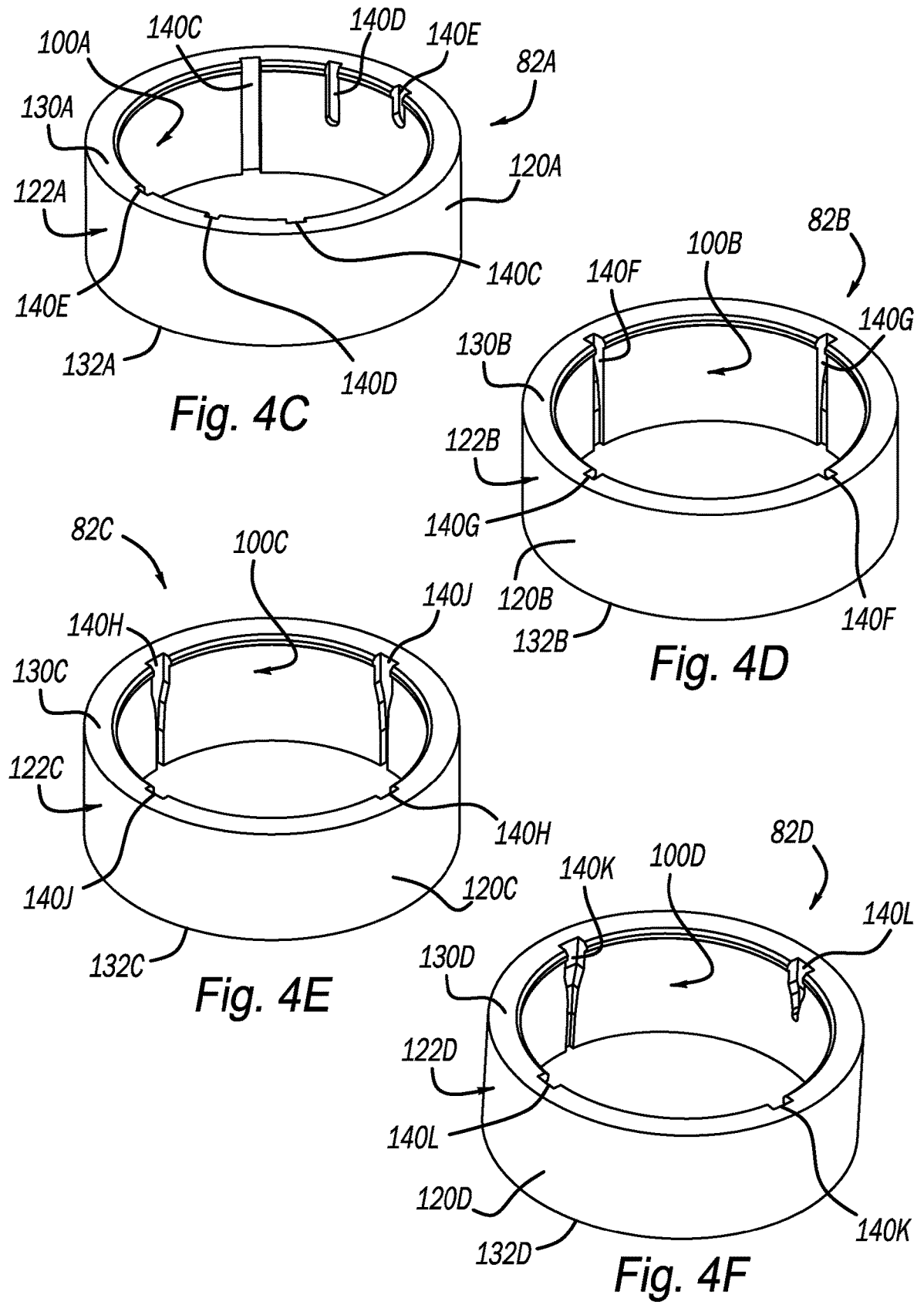
FIG. 4C is a perspective view of an RCO flask of the RCO assembly constructed in accordance to another example of the present disclosure.
FIG. 4D is a perspective view of an RCO flask of the RCO assembly constructed in accordance to another example of the present disclosure.
FIG. 4E is a perspective view of an RCO flask of the RCO assembly constructed in accordance to another example of the present disclosure.
FIG. 4F is a perspective view of an RCO flask of the RCO assembly constructed in accordance to another example of the present disclosure.

FIG. 4C shows RCO flask 82A having a flask body 120A having an inner diameter surface 100A and an outer diameter surface 122A. The flask body 120A extends between a first axial end 130A and a second axial end 132A. Flask passages or channels 140C, 140D and 140E are defined in the inner diameter surface 100A of the flask body 120A. In the example shown, each flask channel 140C, 140D and 140E comprises a pair of diametrically opposing channels. The flask channel 140C extends from the first axial end 130A all the way to the second axial end 132A. The flask channels 140D and 140E extend from the first axial end 130A and terminate at intermediate locations between the first and second axial ends 130A, 132A. The flask channel 140E is shorter than the flask channel 140D. As can be appreciated, hydraulic fluid interfaces with more channels as the RCO piston 80 travels toward the end cap 26 creating progressive damping characteristics.

FIG. 4D shows RCO flask 82B having a flask body 120B having an inner diameter surface 100B and an outer diameter surface 122B. The flask body 120B extends between a first axial end 130B and a second axial end 132B. Flask passages or channels 140F, and 140G are defined in the inner diameter surface 100B of the flask body 120B. In the example shown, both flask channels 140F, and 140G comprises a pair of diametrically opposing channels. Both of the flask channels 140F and 140G extend from the first axial end 130B all the way to the second axial end 132B. In examples, the flask channels 140F and 140G have varying depths into the flask body 120B progressive damping characteristics. In the example shown, the flask channels 140F and 140G have greater depths near the first axial end 130B.

FIG. 4E shows RCO flask 82C having a flask body 120C having an inner diameter surface 100C and an outer diameter surface 122C. The flask body 120C extends between a first axial end 130C and a second axial end 132C. Flask passages or channels 140H, and 140J are defined in the inner diameter surface 100C of the flask body 120C. In the example shown, both flask channels 140H, and 140J comprises a pair of diametrically opposing channels. Both of the flask channels 140H and 140J extend from the first axial end 130C all the way to the second axial end 132C. In examples, the flask channels 140H and 140J have varying widths into the flask body 120C progressive damping characteristics. In the example shown, the flask channels 140H and 140J have greater widths near the first axial end 130C.

FIG. 4F shows RCO flask 82D having a flask body 120D having an inner diameter surface 100D and an outer diameter surface 122D. The flask body 120D extends between a first axial end 130D and a second axial end 132D. Flask passages or channels 140K, and 140L are defined in the inner diameter surface 100D of the flask body 120D. In the example shown, both flask channels 140K, and 140L comprises a pair of diametrically opposing channels. The flask channels 140K extends from the first axial end 130D all the way to the second axial end 132D. The flask channel 140L extends from the first axial end 130D to an intermediate location between the first and second axial ends 130D and 132D. In examples, the flask channels 140K and 140L have varying widths into the flask body 120D progressive damping characteristics. In the example shown, the flask channels 140H and 140J have greater widths near the first axial end 130D. It will be appreciated that some or any of the channel characteristics shown in some of the RCO flasks 82, 82A, 82B, 82C, 82D can be incorporated on any of the other RCO flasks. Moreover, it is contemplated that the passages and channels shown in the examples herein can take alternate shapes and forms to achieve different flow characteristics.

Figure 6A:
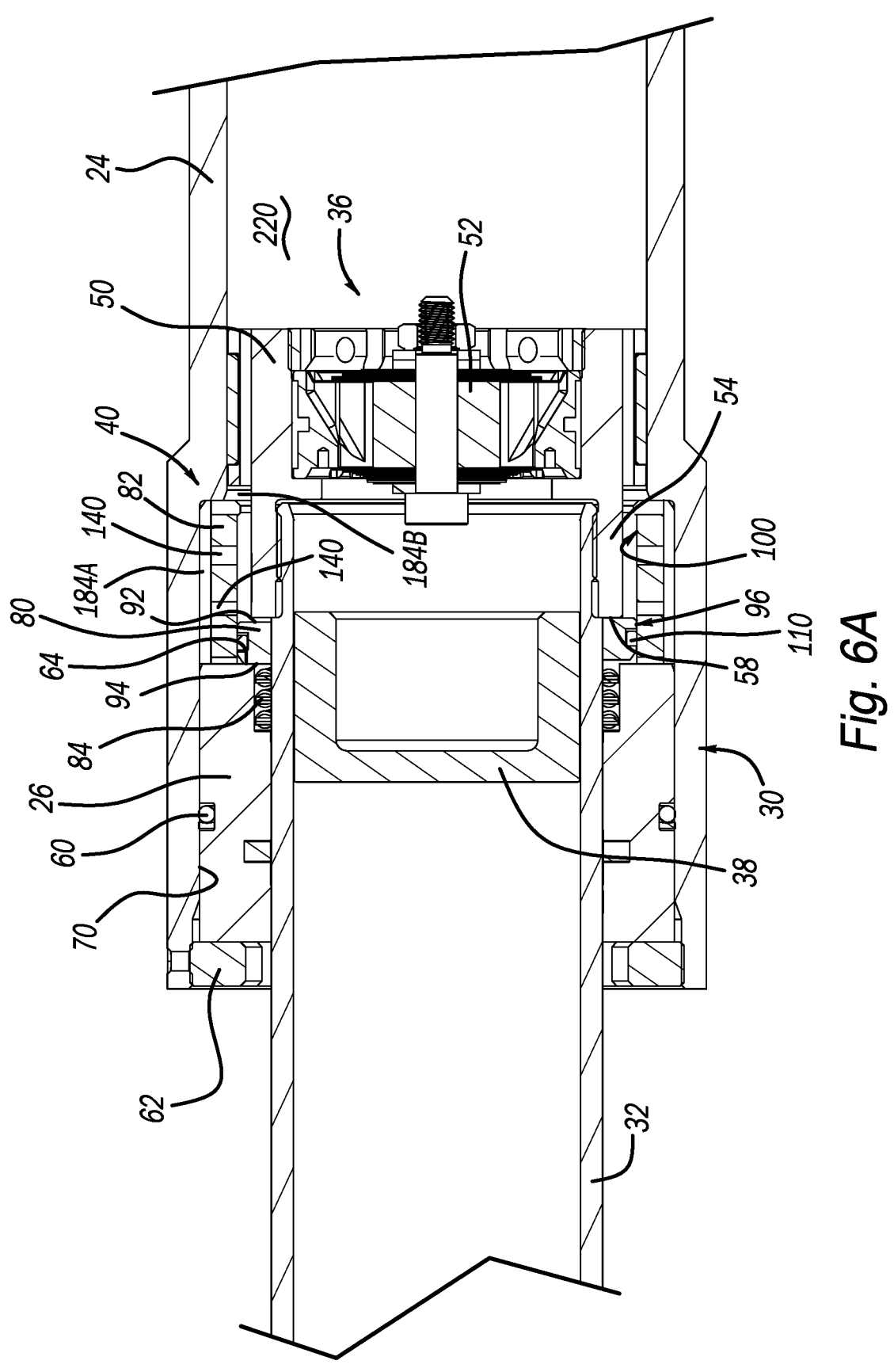
FIG. 6A is a sectional view of the hydraulic vibration damper of FIG. 3 and shown at an end of a rebound event with the RCO piston seated against an end cap of a seal pack assembly transmitting force through the seal pack assembly.

With reference now to FIG. 6A, the RCO assembly 40 is shown at an end of a rebound event. In particular, the RCO piston 80 is seated against the end cap 26 of the seal pack assembly 30, transmitting force through the seal pack assembly 30 and the locking ring 62. The locking ring 62 constrains the RCO flask 82, the seal pack assembly 30, the RCO piston 80 and the main piston assembly 36 inside the housing assembly 20.

Figure 6B:
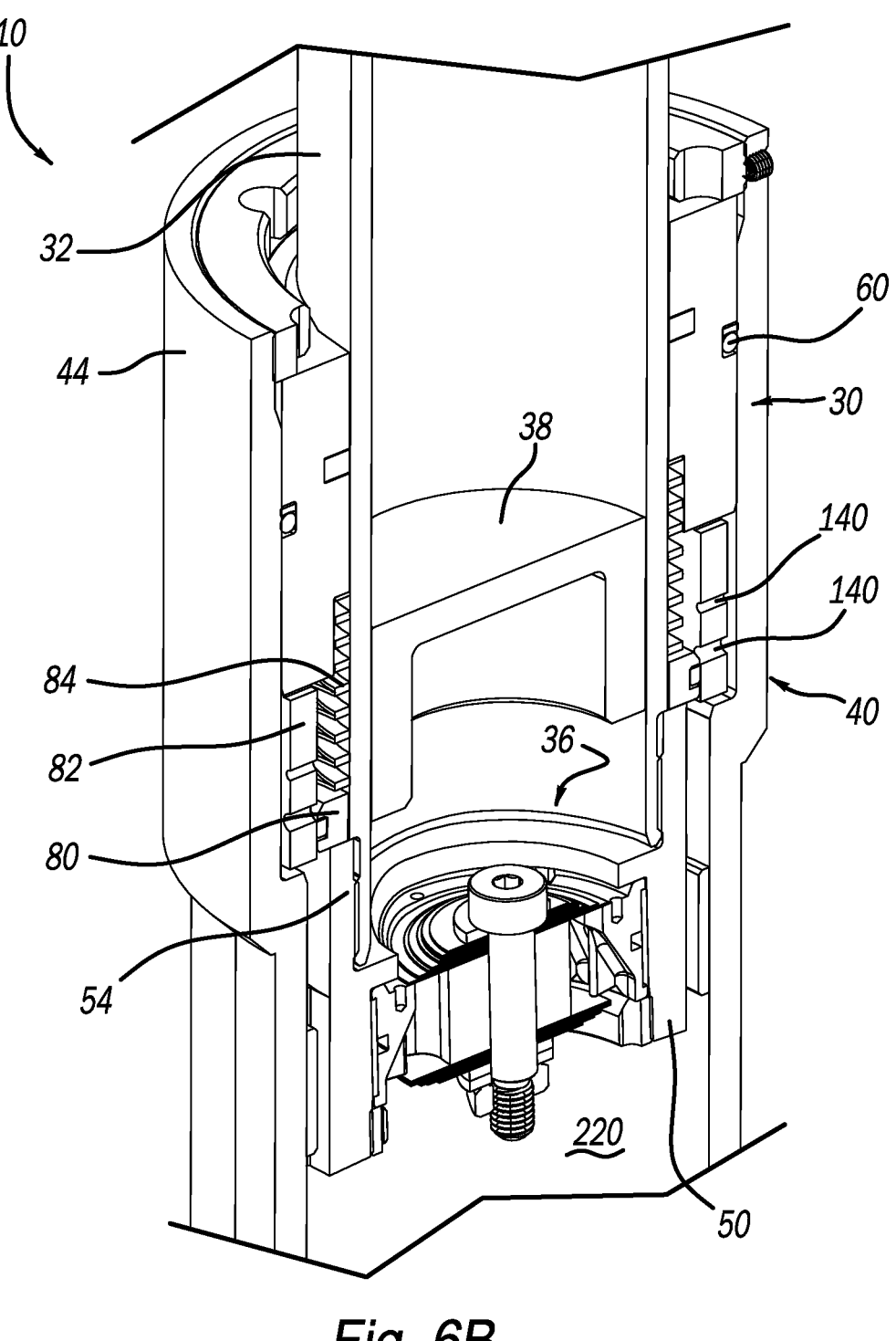
FIG. 6B is a sectional view of the hydraulic vibration damper of FIG. 6A and shown after the rebound event with the biasing member returning the RCO piston toward the home position shown in FIG. 2 as the piston rod moves back toward the compression direction.
Figure 7:
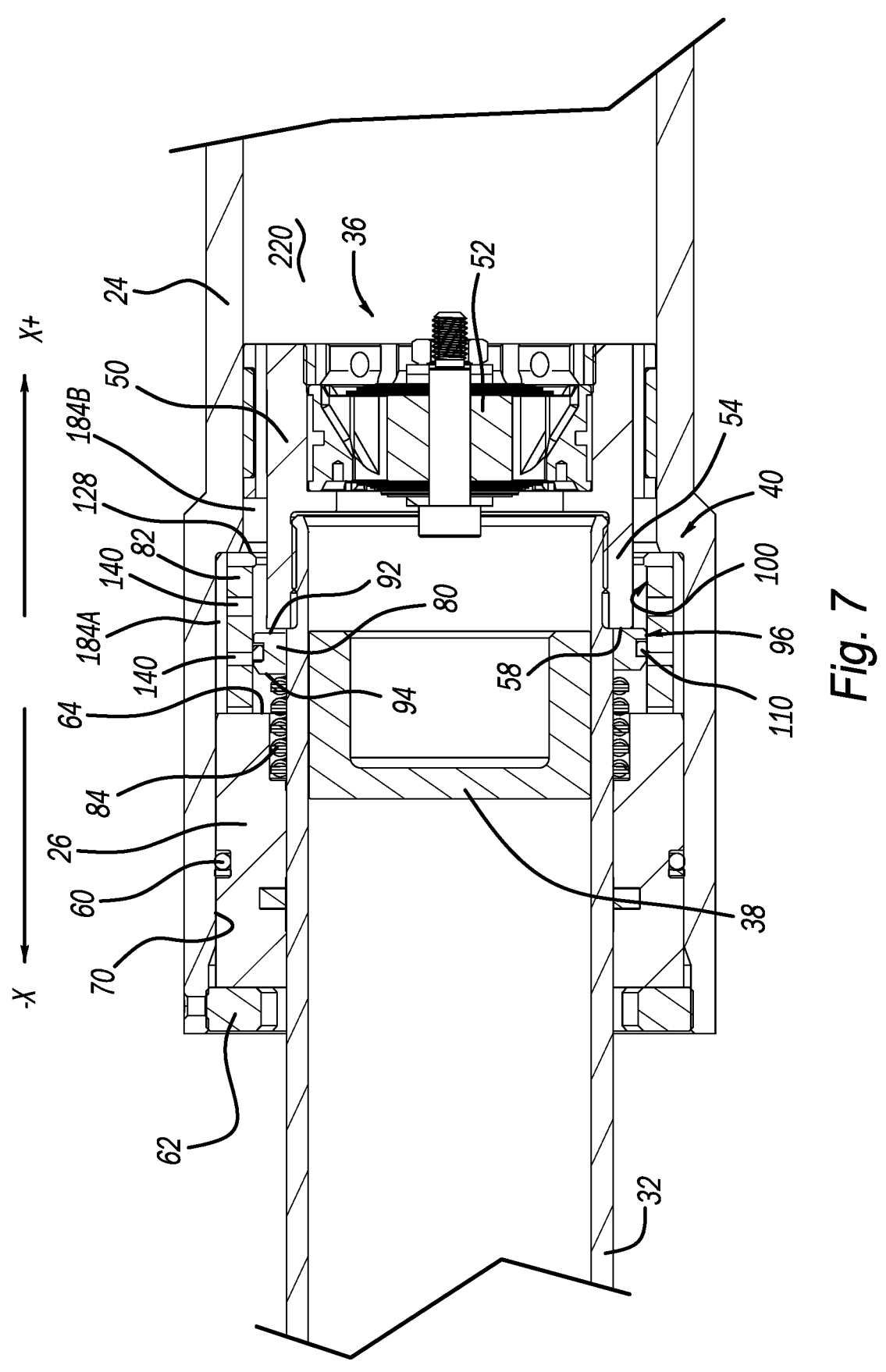
FIG. 7 is a sectional view of the hydraulic vibration damper of FIG. 6B and shown subsequent to a full extension event when the main piston begins travelling away from the RCO piston during a compression event.

With reference now to FIGS. 6B and 7, description of the RCO piston 80 returning toward the home position shown in FIG. 2 subsequent to a full extension event (FIG. 6A) will be described. After the RCO piston 80 has bottomed out against the end cap 26 of the seal pack assembly 30 in a full extension event (FIG. 6), the main piston 50 begins traveling away (FIG. 7) from the RCO piston 80 in the X+ direction during a compression event and eventually leaves contact with the RCO piston 80. The RCO piston 80 is able to travel in the X+ direction due to the biasing force of the biasing member 84. The RCO piston 80 will continue to travel in the X+ direction until it is secured against the shoulder 128 of the RCO flask 82 back at the home position.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A hydraulic vibration damper comprising:
   a housing assembly including a main housing, an end cap and a rebound cut off (RCO) assembly;
   a rod assembly including a hollow piston rod coupled to a main piston assembly, the main piston assembly having a main piston that is displaced along the main housing between extension and compression directions; and
   wherein the RCO assembly is disposed between the main housing and the hollow piston rod, and comprises:
      an RCO piston having a piston body including a first engaging surface, a second engaging surface and an outer annular sliding surface;
      an RCO flask having a flask body including an inner diameter surface and an outer diameter surface, the RCO flask body defining at least one flask passage defined therein that communicate hydraulic fluid along the flask body; and
      wherein the RCO piston is configured to translate relative to the RCO flask during a rebound event due to urging of the main piston, wherein during the translation, the hydraulic fluid is caused to flow (i)

from a high pressure zone between the hollow piston rod and the RCO flask; (ii) along the at least one passage; and (iii) into a low pressure zone between the RCO flask and the main housing.

2. The hydraulic vibration damper of claim 1 wherein the RCO flask body extends between a first axial end and a second axial end, the RCO flask body defining a flask shoulder at the first axial end, wherein the flask shoulder engages the RCO piston and therefore limits movement of the RCO piston at a home position prior to and subsequent to the rebound event.

3. The hydraulic vibration damper of claim 1, wherein the RCO assembly further comprises:
   a biasing member disposed between the end cap and the RCO piston, the biasing member biasing the RCO piston toward the home position.

4. The hydraulic vibration damper of claim 1 wherein the main piston includes an annular wall having an end working surface, wherein the first engaging surface of the RCO piston engages the end working surface during the rebound event.

5. The hydraulic vibration damper of claim 1 wherein the at least one passage further comprises:
   first passages having first diameters and second passages having second diameters, wherein the first and second diameters are distinct corresponding to supporting distinct flow rates therethrough.

6. The hydraulic vibration damper of claim 5 wherein the flask body defines at least one channel formed on the outer diameter surface, wherein the first and second passages are defined at the at least one channel.

7. The hydraulic vibration damper of claim 6 wherein the at least one channel defines a relief notch, wherein hydraulic fluid flows from the low pressure zone, through the relief notch, past the main piston and to a compression side of the main piston during the rebound event.

8. The hydraulic vibration damper of claim 7 wherein during the rebound event a first pressure is defined at a first zone bypass area, a second pressure is defined at a second zone bypass area, and a third pressure is define at a third zone bypass area, the first zone bypass area defined with all passages of the first and second passages, the second zone bypass area defined with only the second passages of the first and second passages, and the third zone bypass area defined at the relief notch.

9. The hydraulic vibration damper of claim 1, further comprising:
   a locking ring fixed to an inner surface of the main housing, the locking ring constraining the end cap relative to the main housing.

10. The hydraulic vibration damper of claim 1 wherein the end cap is arranged between the main housing and the hollow piston rod and has an impact surface thereon, wherein the second engaging surface of the RCO piston engages the impact surface of the end cap at an end of the rebound event.

11. The hydraulic vibration damper of claim 1 wherein the at least one flask passage comprises at least one channel defined along the inner diameter of the flask body.

12. A hydraulic vibration damper comprising:
   a housing assembly including a main housing, and end cap and a rebound cut off (RCO) assembly;
   a rod assembly including a hollow piston rod coupled to a main piston, the main piston having a main body that includes an annular wall having an end working surface thereon, wherein the main piston is displaced along the main housing between extension and compression directions; and
wherein the (RCO) assembly is disposed between the main housing and the hollow piston rod and comprises:
   an RCO piston having a piston body including a first engaging surface, a second engaging surface and an outer annular sliding surface;
   an RCO flask having a flask body including an inner diameter surface and an outer diameter surface, the RCO flask body defining at least one flask passage defined therein from the inner diameter surface to the outer diameter surface; and
   wherein the first engaging surface of the RCO piston is engaged by the end working surface of the main piston causing the RCO piston to translate relative to the RCO flask during a rebound event, wherein during the translation, hydraulic fluid is caused to flow through the at least one passage and past the main piston to a compression side of the main piston.

13. The hydraulic vibration damper of claim 12 wherein the RCO flask body extends between a first axial end and a second axial end, the RCO flask body defining a flask shoulder at the first axial end, wherein the flask shoulder engages the RCO piston and therefore limits movement of the RCO piston at a home position prior to and subsequent to the rebound event.

14. The hydraulic vibration damper of claim 12, wherein the RCO assembly further comprises:
   a biasing member disposed between the end cap and the RCO piston, the biasing member biasing the RCO piston toward the home position.

15. The hydraulic vibration damper of claim 12 wherein the at least one passage further comprises:
   first passages having first diameters and second passages having second diameters, wherein the first and second diameters are distinct corresponding to supporting distinct flow rates therethrough.

16. The hydraulic vibration damper of claim 15 wherein the flask body defines at least one channel formed on the outer diameter surface, wherein the passages are defined at the at least one channel.

17. The hydraulic vibration damper of claim 16 wherein the at least one channel defines a relief notch, wherein hydraulic fluid flows from the low pressure zone, through the relief notch, past the main piston and to a compression side of the main piston during the rebound event.

18. The hydraulic vibration damper of claim 17 wherein during the rebound event a first pressure is defined at a first zone bypass area, a second pressure is defined at a second zone bypass area, and a third pressure is defined at a third zone bypass area, the first zone bypass area defined with all passages of the first and second passages, the second zone bypass area defined with only the second passages of the first and second passages, and the third zone bypass area defined at the relief notch.

19. The hydraulic vibration damper of claim 12, further comprising:
   a locking ring fixed to an inner surface of the main housing, the locking ring constraining the end cap relative to the main housing.

20. The hydraulic vibration damper of claim 12 wherein the second engaging surface of the RCO piston engages an impact surface of the end cap at an end of the rebound event.

* * * * *